United States Patent

[11] 3,578,121

| [72] | Inventor | Jean Maurice<br>Paris, France |
|---|---|---|
| [21] | Appl. No. | 814,047 |
| [22] | Filed | Apr. 7, 1969 |
| [45] | Patented | May 11, 1971 |
| [73] | Assignee | Societe Anonyme Francaise Du Ferodo<br>Paris, France |
| [32] | Priority | Apr. 9, 1968 |
| [33] | | France |
| [31] | | PU147,428 |

[54] FRICTION DISC WITH TORSIONAL DAMPENER
19 Claims, 9 Drawing Figs.

[52] U.S. Cl. ............................................ 192/106.2,
64/27
[51] Int. Cl. ...................................... F16d 47/02,
F16d 3/14
[50] Field of Search............................... 192/106.2,
106.1, 107 (CP), 55

[56]         References Cited
           UNITED STATES PATENTS

| 2,314,948 | 3/1943 | Nutt .............................. | 192/106.2 |
| 2,613,515 | 10/1952 | Crutchley...................... | 192/106.2X |
| 2,613,785 | 10/1952 | Mohns........................... | 192/106.2X |
| 2,636,363 | 4/1953 | Nutt .............................. | 192/106.2X |

FOREIGN PATENTS

| 691,887 | 8/1964 | Canada ......................... | 192/106.2 |
| 956,193 | 4/1964 | Great Britain................ | 192/107CP |

Primary Examiner—Benjamin W. Wyche
Attorney—Young & Thompson

ABSTRACT: In a clutch friction-unit of the kind comprising a friction disc mounted between two annular plates fixed to each other and coupled to said annular plates by elastic means, the retention in position of the elastic means is ensured by pressed-out portions, formed alternately as dished portions and relief portions in said annular plates.

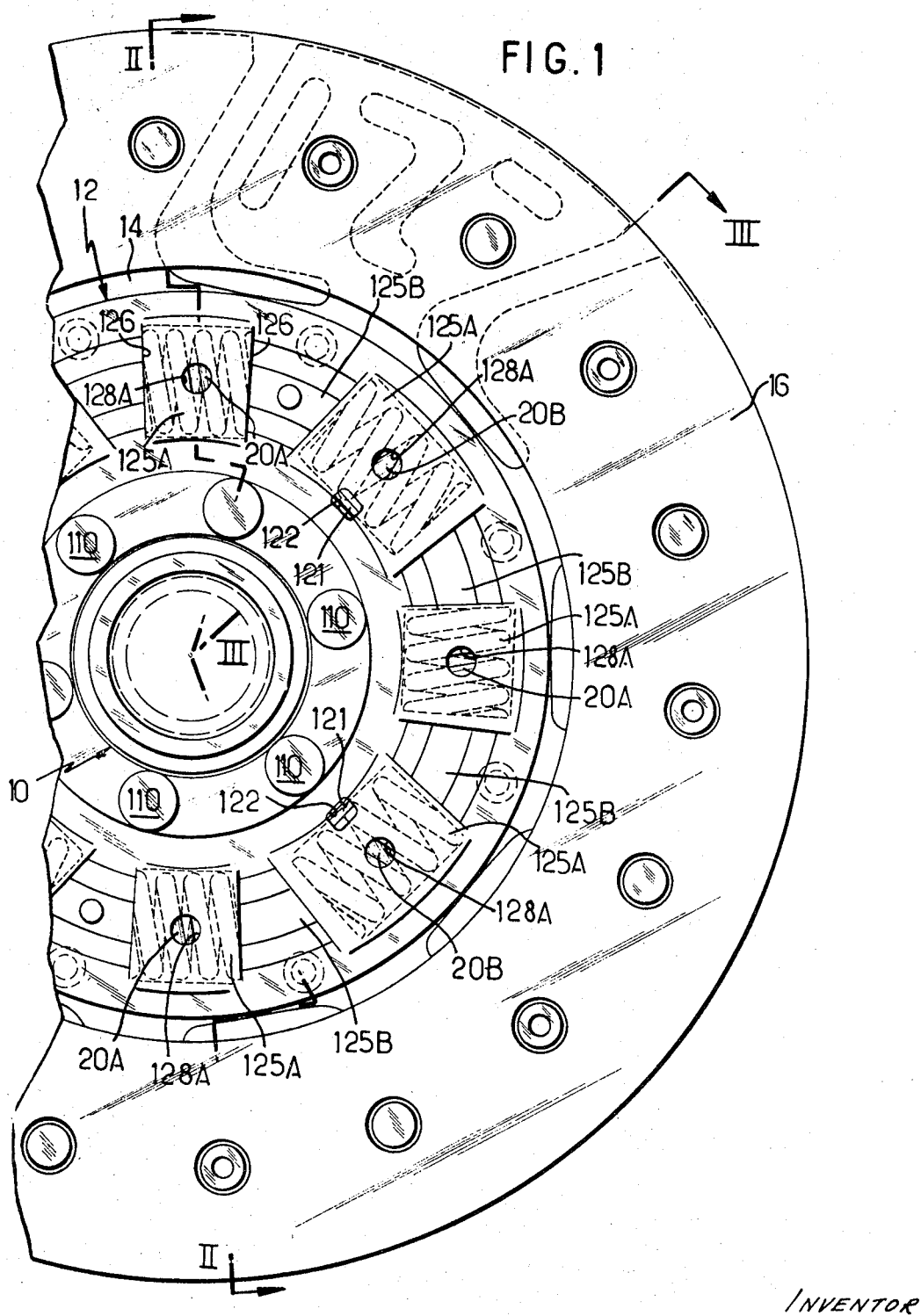

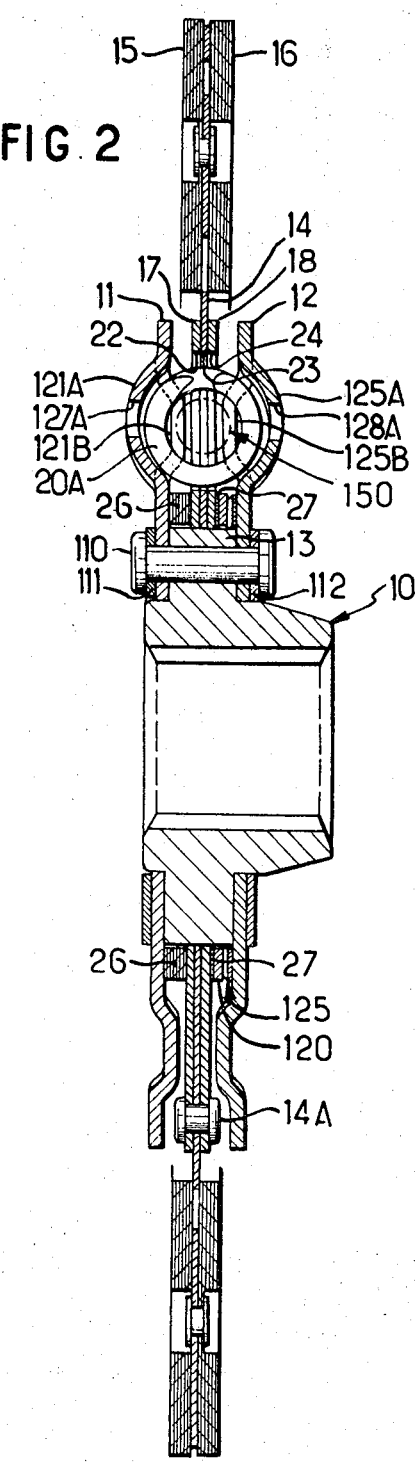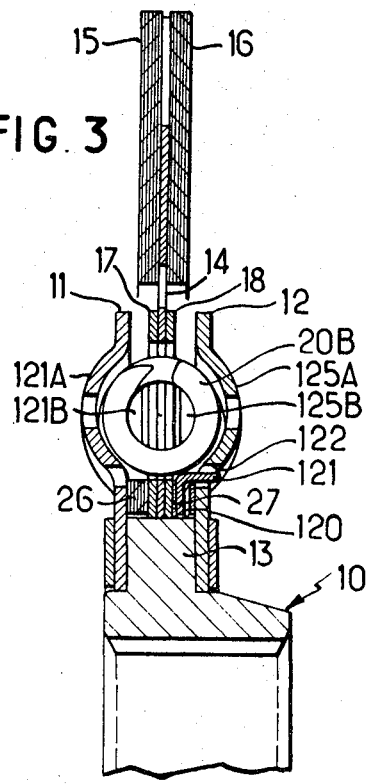

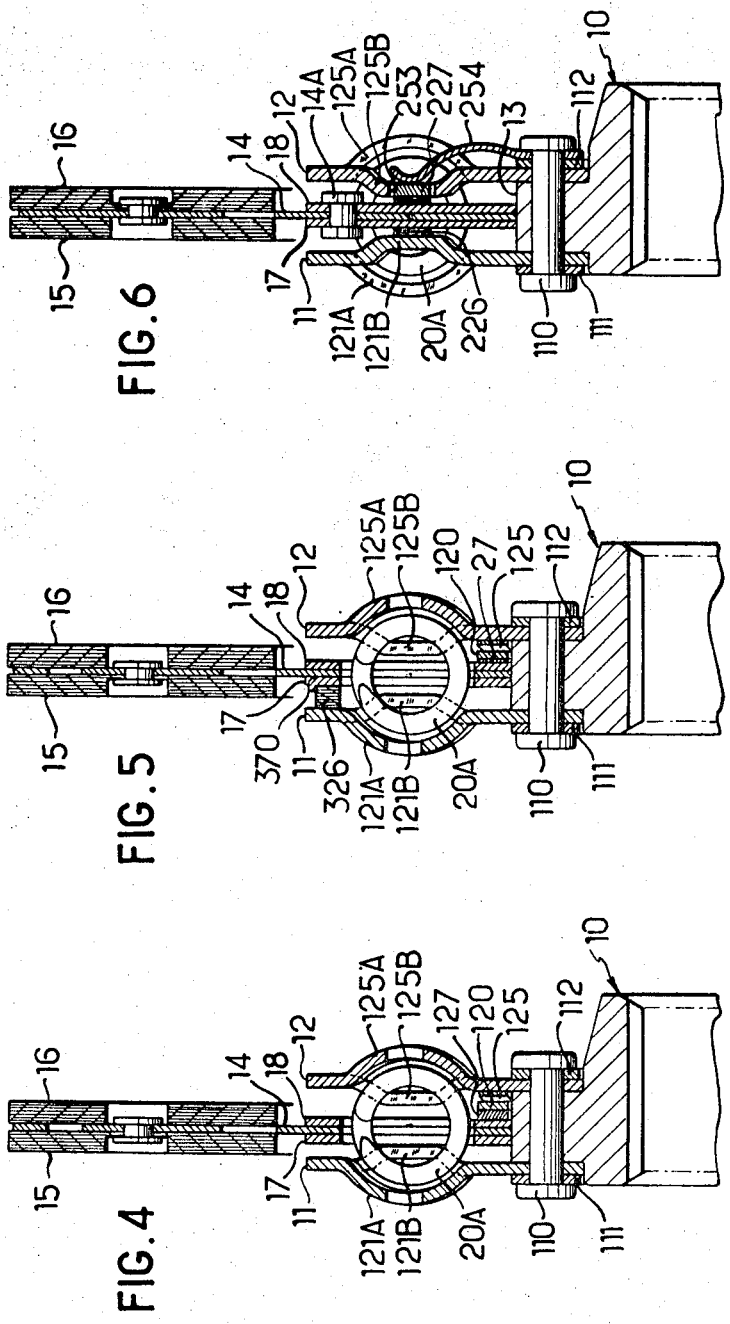

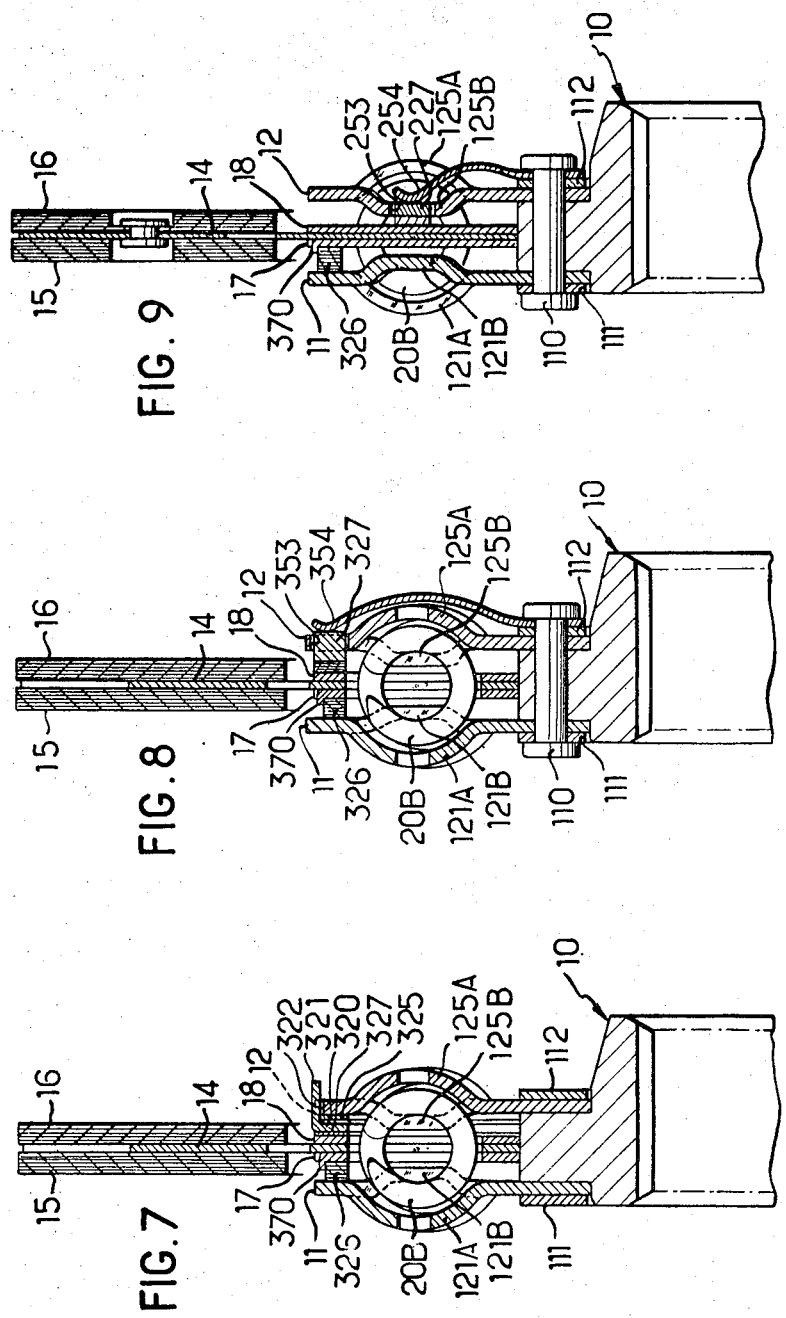

FRICTION DISC WITH TORSIONAL DAMPENER

The present invention relates to a clutch friction-unit with a shock-absorbing hub, and is more particularly directed to a clutch friction unit with a shock-absorbing or damping hub capable of being installed in a heavy vehicle.

As is well known, a clutch friction-unit with a damping hub comprises a hub and two parallel transverse annular plates rigidly fixed to each other at a certain distance apart, while between these two plates is arranged a so-called friction disc which is provided at its periphery, and on each side, with friction linings, and which is coupled for rotation to the said plates by elastic means.

The two annular plates are generally fixed to the hub, and two friction rings are additionally provided on each side of the friction disc, each of these friction rings being arranged between one of the annular plates and the friction disc, at the internal periphery of this latter, this periphery being preferably reinforced by two reinforcement rings fixed for rotation on the friction disc.

It is economical to secure the plates on the hub by a simple driving fit of the said plates on the hub, with a corresponding formation of splines, the internal periphery of the said plates having been slotted for that purpose.

This assembly has the particular disadvantage of rendering the use of a relatively hard steel essential for the plates, while the hub is of relatively mild steel.

It has also already been proposed to secure the plates to the hub by means of rivets which pass through a radial flange of the hub, the said plates being supported against this flange.

This assembly provides the particular advantage of permitting a free choice, for the plates and the hub, of any appropriate grades of steel, independently of each other, and in particular the annular plates can be made of mild steel.

In the case where the annular plates are made from hard steel sheet, the retention of the elastic means which couple the plates to the friction disc is effected in known manner by lining each of the said plates externally with another annular plate provided, at the level of the said elastic means, with openings on the tangential edges of which the elastic means are supported.

In the case where mild steel sheet is utilized for the annular plates, this method of support is not possible, since the useful supporting surface is not sufficient, taking account of the mechanical properties of steel of this kind.

The present invention has for its object to overcome this drawback.

According to the invention, a clutch friction-unit with a damping hub, of the kind comprising a hub and two parallel transverse annular plates rigidly fixed to each other at a certain distance apart, while between the two plates is mounted a so-called friction disc which is provided on each side of its periphery with friction linings, and which is coupled for rotation with the said plates by elastic means, is characterized in that the retention of the said elastic means is effected by pressed-out portions formed alternately as a hollow and as a protuberance in the said plates.

In accordance with a particular form of construction, at least some of the dished pressings are delimited laterally by grooves which they have in common with the adjacent embossed pressings.

However this may be, the support of the elastic means which couple the annular plates to the friction disc is effected, by virtue of the pressed plates according to the invention, with a surface area greater than that of the similar supporting surfaces in previous constructions, and which is sufficient to permit the use of a mild steel in the construction of the annular plates of the friction unit.

The arrangement according to the invention has also further advantages.

It improves the rigidity of the plates, which is advantageous in view of the fact that the plates are made of mild steel.

Especially by reason of this improved rigidity, it enables the friction rings to be mounted on various diameters of the friction unit.

At the present time, these friction rings are in fact most frequently arranged at the level of the inner periphery of the friction disc. According to the invention, these friction rings may equally well be arranged at the level of the outer periphery of the annular plates, or at the level of the pressed-out portions of these plates, namely at the level of their central zone.

In this latter case, in accordance with a particular form of embodiment of the invention, and due to the local reduction in the distance between the plates and the friction disc due to the pressed-out portions of the said plates, it is even possible to dispense with the provision of one of these friction rings and to substitute for it a metal-metal rubbing contact.

This possibility of various positions of the friction rings permits the economic construction of clutch friction units with friction discs and identical annular plates, which have different characteristics of internal friction, and in particular of friction torque, and it is thus possible to adapt such friction units better to particular conditions of use.

The pressed members according to the invention also enable a better protection to be obtained, with respect to the effects of centrifugal force, of the elastic means which couple the annular plates to the friction disc. In fact, in previous constructions, these elastic means which are displaced radially by the effects of centrifugal force, come into contact with the edges of the windows of the friction disc, of hard steel, in which they are mounted; this may result in a nonnegligible wear of these elastic means. In the friction unit according to the invention, these elastic means come into contact with the sides of the pressed-out portions which characterize the invention, thus avoiding any risk of damage.

In the case where the elastic means which couple the annular plates to the friction disc are springs, the arrangement according to the invention has the further advantage of enabling additional springs to be put into position coaxially inside the main springs, these additional springs being easily supported against the edges of the pressed-out dished portions of the annular plates.

The objects, characteristic features and advantages of the invention will furthermore be brought out in the description which follows below, reference being made to the accompanying drawings, in which:

FIG. 1 is a partial view in elevation of a friction unit according to the invention;

FIG. 2 is a view in axial section of this friction unit, taken along the broken line II-II of FIG. 1;

FIG. 3 is a half-view in axial cross section of this friction unit, taken along the line III-III of FIG. 1;

FIGS. 4 to 9 are half-views in axial cross section, each relating to an alternative form of construction.

In FIGS. 1 to 3, there is shown at 10 a hub provided internally with splines permitting its assembly on a shaft; 11 and 12 are two rigid parallel annular plates which are supported against a radial flange 13 of the hub 10, on each side of this flange, the plates being fixed to the flange by rivets 110; at 111, 112, are shown washers which reinforce the plates 11 and 12 at the level of the rivets 110; at 14, a friction disc is shown, provided at its periphery with friction linings 15 and 16, the disc being reinforced in its central portion and on each side of this portion, by rings 17, 18, fixed by rivets 14A. Helicoidal springs 20A, 20B are mounted in windows 22, 23, 24, formed respectively in the ring 17, the disc 14 and the ring 18, the said springs 20A, 20B belonging respectively in the example shown to two sets of four springs of different strengths interleaved one in the other. Friction rings 26 and 27 are respectively mounted between the reinforcing ring 17 and the annular plate 11, and the reinforcing ring 18 and the plate 12, in the zone of smallest diameter of the friction disc 14.

According to the invention, the annular plates 11 and 12 are made of mild steel, this arrangement being made possible by the riveted assembly of these plates on the hub 10. It is thus possible to press out these plates instead of cutting them, and according to the invention, in order to ensure the retention of the springs 20A, 20B and therefore the elastic coupling of the friction disc 14 to the hub 13, there are formed in the plates 11, 12, pressed portions which are alternately outwardly convex, 121A, 125A respectively and outwardly concave, 121B, 125B respectively.

In accordance with the form of construction shown, each concave pressing 125B for example, is laterally defined by two grooves 126 which it has in common with the adjacent concave pressing 125A. The edge of these grooves 126 forms a support for the associated springs 20A along a chord of these latter relatively close to their axis. This arrangement provides an excellent support for the springs 20A and in addition facilitates, if so desired, the positioning of additional springs arranged coaxially in the springs 20A, as shown diagrammatically in broken lines at 150 in FIG. 2.

If necessary, it is of course possible after pressing to give the annular plates 11, 12 a hardness comparable with that of plates made of hard steel, by means of an appropriate treatment, for example by carbonitridation.

In addition, the relief pressings 121A, 125A are provided with observation openings 127A, 128A respectively, which enable the positions of the springs 20A or 20B to be checked.

By means of an arrangement which is known per se and which does not fall within the scope of the present invention, the windows 22, 23, 24 of two of the springs 20A have, in the example shown, the same angular opening as that of the associated pressings 121A, 125A, and for the springs 20B, these windows 22, 23, 24 have an angular opening greater than that of the corresponding pressed portions 121A, 125A for the springs 20A, and greater than that of the associated pressed portions 121B, 125B. For the other two springs 20A, the opening of the windows 22, 23, 24 is intermediate between that of the corresponding pressed members 121A, 125A of the first two springs 20A and that of the present members 121B, 125B of the springs 20B.

Following another aspect of the invention, the friction ring 27 is arranged axially between the friction disc 14 and a supporting washer 120, which is provided with axial lugs 121 engaged in openings 122 formed in the annular plate 12 (see FIGS. 1 and 3). This supporting washer is thus rigidly fixed for rotation with the annular plate 12.

Between the supporting washer 120 and the plate 12 is inserted an elastic washer 125, of the kind having a number of circumferential corrugations, four for example.

In a manner known per se, the friction rings 26, 27 and the unit formed by the friction disc 14 and the reinforcement rings 17, 18 which it carries, are free to move axially inside the space formed between the annular plates 11, 12.

The friction ring 27 which is the nearest to the supporting washer 120 and therefore to the elastic clamping washer 125, is preferably made of a material which has a coefficient of friction less than that of the constituent material of the friction ring 26.

For example, the ring 27 is made of a material of the type sold under the commercial name of "Teflon," which has a coefficient of friction of about 0.05 to 0.10, while the ring 26 is of asbestos cardboard impregnated with various resins, and having a coefficient of friction of about 0.25 to 0.36.

In consequence, the thickness of the ring 27 is less than that of the ring 26.

The operation of a friction unit of the kind described is well known and will be only briefly referred to below.

When a torque is applied to the friction disc 14 for example, this torque is transmitted elastically to the hub 10, first by two of the springs 20A only, and then by all the springs 20A, and finally by the assembly of the springs 20A, 20B, conjointly with an angular displacement of the disc 14 with respect to the hub 10. This displacement is produced, on the one hand in opposition to the action of the springs 20A, 20B and on the other hand in opposition to the damping force applied by the friction rings 26, 27, the elastic washer 125 ensuring the continuity of this force, irrespective of the wear of the said rings.

It will be observed that under the possible effects of centrifugal force, the springs 20A, 20B will come into contact, not with the sharp and hard edge of the windows 22, 23, 24 in which they are housed, but with the lateral rounded flanks of the pressed portions 121A, 125A.

In the foregoing description, it has been assumed that the friction zones provided between the disc 14 (or its reinforcement rings 17, 18) and the plates 11, 12, and materialized by the friction rings 26, 27 described above, were developed at the level of the annular zone of the smallest diameter of the friction disc 14.

There will now be described with reference to FIGS. 4 to 9, alternative forms of construction in which these friction zones are located, together or separately, either in the zone of smallest diameter of the disc 14, or in the zone of largest diameter of the plates 11, 12, or in an intermediate zone at the level of the pressed portions 121B, 125B.

In accordance with the alternative form shown in FIG. 4, the friction ring 27 described above is replaced by a ring 127 of sufficient thickness for the dished pressings 121B to be in frictional contact metal-to-metal, with the reinforcement ring 17 of the friction disc 14. This arrangement, which is rendered possible by the local approach of the pate 12 to the disc 14, due to the pressed portions according to the invention, makes it possible to eliminate the friction ring 26 previously described.

FIG. 5 relates to an alternative form in which the friction ring 26 previously described is replaced by a similar friction ring 326 arranged in the zone of largest diameter of the plate 11, while the associated friction ring 27 remains in the vicinity of the zone of smallest diameter of the disc 14.

The radial retention of this ring 326 is effected by any appropriate means such as sticking, or alternatively by axial projections formed on the annular plate 11 or on the reinforcement ring 17 of the disc 14, the said axial projection cooperating either with the outer periphery or with the inner periphery of the ring 326. In the example shown, these axial projections are tongues 370, bent back axially at the external periphery of the reinforcement ring 17.

FIG. 6, which is a half-view in axial cross section passing between two springs 20A, 20B in the central area of the dished pressings 121B, 125B, relates to an alternative form of construction in which the friction rings 26, 27 described with reference to FIGS. 1 to 3, are respectively replaced by ring segments 226 and friction shoes 227, arranged at the level of the dished pressings 121B, 125B.

The ring segments 226 are fixed, for example by sticking, to the annular plate 11, and the shoes 227 are arranged inside the windows 253 of the annular plate 12. In this case, the axial clamping action of these friction members is effected by elastic radial plates or lugs 254 arranged on the outside of the plates 11, 12, on the external surface of the annular plate 12 in the example shown. Each of these lugs 254 is rigidly fixed to the hub 13 at one of its extremities by one of the rivets 110 which serve for fixing the annular plates 11, 12 to this hub, and bears at its other extremity, which is free, against a friction shoe 227. Each shoe 227 is formed in a construction known per se, with a friction lining fixed on a supporting plate.

In FIG. 7, which is a half-view in cross section similar to the preceding FIG. 3, the friction rings 26, 27, the supporting washer 120 with its angular setting lugs 121 and the elastic washer 125 are respectively replaced by friction rings 326, 327, a supporting washer 320 with angular setting lugs 321 and an elastic washer 325, arranged at the level of the annular zone of largest diameter of the annular plates 11, 12, that is to say at the periphery of these latter. This radial position of the ring 326 is effected, as in FIG. 5, by axial projections formed on the reinforcement washer 17 of the disc 14, while the radial position of the supporting washer 320 and the elastic washer 325 is ensured by the axial lugs 321 on the supporting washer 320, which cooperate with notches 322 in the annular plate 12. The friction ring 327 is stuck either on the supporting washer 320 or on the reinforcement washer 18 of the disc 14.

In accordance with the alternative form shown in FIG. 8, this supporting washer 320 and the elastic washer 325 are respectively replaced by friction shoes 327 and elastic radial lugs 354 of the same type as those above described with reference to FIG. 6, the shoes being housed inside windows 353 of the annular plate 12.

Finally, according to the alternative construction given in FIG. 9, there is on the one hand a peripheral friction ring 326, and on the other hand, at the level of the dished pressings 121B, 125B, friction shoes 227 and elastic radial lugs 254.

These various arrangements are of course only given by way of example in order to illustrate the numerous combinations which it is possible to obtain by associating in different ways the various rings, members or friction zone, and/or the associated elastic tension means with an axial action.

Thus, according to an alternative form of construction (not shown) the clamping of the friction rings 26, 27 in the form of construction illustrated in FIGS. 1 to 3, is ensured by elastic radial lugs of the same type as those described with reference to FIGS. 6, 8 or 9.

I claim:

1. A friction clutch unit with damping means, comprising a hub, a pair of parallel spaced-apart annular plates rigidly fixed to each other and carried by the hub, a friction disc between the plates and having friction material at its periphery, resilient means coupling the friction disc and said plates for conjoint rotation, the plates having a plurality of juxtaposed deformed portions that consecutively and alternately project to opposite sides of the plane of the associated plate and are arranged in circles, the plates being aligned to form pairs of said deformed portions that extend toward each other and other pairs of deformed portions that extend away from each other, said resilient means being retained tangentially between peripherally spaced pairs of said deformed portions extending toward each other thereby to limit tangential movement of said resilient means, said resilient means being disposed laterally between axially spaced pairs of said deformed portions extending away from each other to limit axial and radial movements of said resilient means.

2. A friction clutch unit as claimed in claim 1, said annular plates being rigidly fixed to said hub, and means resiliently mounting said friction disc for axial movement relative to said hub.

3. A friction clutch unit as claimed in claim 1, said friction material being in the form of two friction elements one between the friction disc and one of the annular plates and the other between the friction disc and the other of said plates, and means resiliently mounting said friction disc on said hub for axial movement relative to said hub.

4. A friction clutch unit as claimed in claim 3, there being metal-to-metal contact between one of said friction elements and its associated said plate.

5. A friction clutch unit as claimed in claim 4, the last-named friction element being disposed at the same radial distance from the axis of the hub as said deformed portions of the annular plates.

6. A friction clutch unit as claimed in claim 3, and a ring, a ring segment or a shoe, on at least one of said friction elements between said friction disc and the associated said plate.

7. A friction clutch unit as claimed in claim 6, the last-named said friction element being disposed in one of the following annular portions: the annular portion of the friction disc closest to the axis of the hub, the annular portion of the annular plates farthest from the axis of the hub, the portion of the annular plates that is situated at the same radial distance from the axis of the hub as said deformed portion.

8. A friction clutch unit as claimed in claim 3, said resilient mounting means being fixed between one of the annular plates and a supporting washer which is axially movable relative to the hub, said washer being fixed for rotation with the associated said annular plate.

9. A friction clutch unit as claimed in claim 3, said resilient mounting means comprising a washer with circumferential corrugations.

10. A friction clutch unit as claimed in claim 8, said washer having axial lugs at its periphery engaged in openings in the associated said plate for fixing said washer to said associated plate.

11. A friction clutch unit as claimed in claim 3, said resilient mounting means comprising at least one resilient radial lug, said lug being fixed at one of its ends to an outer facing surface of a said plate and cooperating at its other end with said friction material through an opening formed in the last-named plate.

12. A friction clutch unit as claimed in claim 11, said annular plates being fixed to the hub by means of rivets which also serve for fixing said lugs.

13. A friction clutch unit as claimed in claim 1, said deformed portions having at least one observation opening.

14. A friction clutch unit as claimed in claim 1, at least some of said deformed portions being bordered by slots that are shared with immediately adjacent said deformed portions.

15. A friction clutch unit as claimed in claim 6, each of said two friction elements comprising a friction ring, the said ring closest axially to the axially acting resilient mounting means having a coefficient of friction less than that of the other said ring.

16. A friction clutch unit as claimed in claim 6, each of said two friction elements comprising a friction ring, the said ring closest axially to said resilient mounting means having a thickness less than the thickness of the other said ring.

17. A friction clutch unit as claimed in claim 6, each of said two friction elements comprising a friction ring, the said ring axially farthest from said resilient mounting means being formed of asbestos cardboard impregnated with resin.

18. A friction clutch unit as claimed in claim 1, said friction material comprising two friction rings each mounted between one of said annular plates and said friction disc, reinforcing rings in the central portion of the friction disc for the reinforcement of the disc, and axially acting resilient means between one of said annular plates and a supporting washer axially movable on the hub for axially but resiliently clamping the friction rings, said supporting washer being fixed for rotation with said one annular plate.

19. A friction clutch unit with damping means comprising a hub, a pair of parallel axially spaced annular plates rigidly fixed to the hub, a friction disc disposed between the plates and having friction material at its periphery, each said plate having a circular series of alternately convex and concave deformed portions that extend alternately from opposite sides of the plane of the plate, said deformed portions terminating in free edges that are spaced axially from the free edges of the adjacent said deformed portions, the plates being so disposed that axially aligned pairs of said deformed portions alternately extend away from each other and toward each other, and resilient means disposed axially between said pairs of deformed portions that extend away from each other and tangentially between said axially aligned pairs of deformed portions that extend toward each other thereby resiliently to couple the friction disc for rotation with the hub.